United States Patent [19]
Arnold

[11] 3,908,272
[45] Sept. 30, 1975

[54] ORTHODONTIC MODEL
[75] Inventor: George R. Arnold, Napa, Calif.
[73] Assignee: Silverado Industries, Inc., Napa, Calif.
[22] Filed: May 9, 1974
[21] Appl. No.: 468,254

[52] U.S. Cl. .................................... 32/71; 32/32
[51] Int. Cl.² ........................................ A61C 19/00
[58] Field of Search .............................. 32/32, 71

[56] References Cited
UNITED STATES PATENTS
1,205,437  11/1916  Delabarre ............................... 32/71
3,820,243  6/1974  Schudy .................................. 32/71

Primary Examiner—Robert Peshock
Attorney, Agent, or Firm—Thomas Schneck, Jr.

[57] ABSTRACT

A study model for forces supplied to teeth wherein model teeth are movably arranged in a raceway within a planar support member. A clamping feature allows model teeth to be moved into a desired position and then held in place by application of force. Orthodontic appliances can then be applied to the model teeth and the force released to study the effect of the appliances on the teeth.

11 Claims, 5 Drawing Figures

ORTHODONTIC MODEL

BACKGROUND OF THE INVENTION

A. Field

The invention relates to orthodontic models, and more particularly to an orthodontic model having fully movable and adjustable model teeth.

B. Prior Art

Previously, orthodontic practitioners have studied the effect of orthodontic appliances on teeth, particularly human teeth, by making wax models of the teeth, then applying orthodontic appliances such as bands, brackets and arch wires; then heating the wax model to allow softening of the wax for tooth movement to observe the effects of the orthodontic appliances. Such a procedure is relatively cumbersome for a practitioner. Moreover, the results obtained are difficult to readily reproduce without making another wax model. Thus, the prior art method is especially inconvenient for use in teaching situations where it is desirable to reproduce the same result many times for student or practitioner observation.

Others have developed models of individually movable teeth or sets of teeth which are individually adjustable to a limited extent. For example see U.S. Pat. No. 3,787,979.

Prior art structures and devices have recognized the need for orthodontic study models. However, to this point there is no known orthodontic study model in which teeth are laterally, rotatably and radially adjustable and wherein upper and lower model jaws are adjustable with respect to each other. Moreover, it is an object of the invention to develop a study model for forces applied to human teeth which avoids the cumbersome wax procedure of the prior art and allows for reproducable study events.

SUMMARY OF THE INVENTION

To provide for a study model which has tipping, laterally, rotatably, and radially fully adjustable model teeth and to otherwise satisfy the objects stated above, an orthodontic model has been devised which includes planar support members defining a raceway therein, in which laterally movable members hold teeth, with rotation and radial movement provided for with respect to each member. A clamping mechanism secures the teeth in place by applying force to the support. Thereupon, a practitioner can apply force producing orthodontic appliances, such as bands, brackets and arch wires, then release these force members, either gradually or rapidly, and observe positions assumed by teeth upon relazation of said forces. This simulates the effect of orthodontic appliances applied to teeth in vivo.

More specifically, a pair of opposed planar support members are provided which each have a shape which generally simulates a human jaw. Within each support member a U-shaped raceway is defined in the plane of the support member generally along the inside periphery of the support member in the approximate position of a human gum relative to said human jaw. Within said raceway, a plurality of socket members are positioned with each socket member being slidable within the raceway to a desired position. Each socket, being a folded leaf spring with holes defined therein, seats a rotatable ball therein, and being of spring material, has means for holding the ball in a fixed position.

A spline member passes through each ball and has a model tooth affixed at one end of the spline. The splines are movable radially inward and outward, for example, up or down with respect to the ball.

The support member has a clamping means which communicates with the socket member for clamping it in a desired position and for exerting force on the spring material of the socket, thereby holding the balls, splines, and model teeth in a fixed position.

A pair of such planar support members may be positioned in roughly the same position as opposed human jaws, with teeth of each support member mutually facing each other. The upper support member is positioned by at least one cantilever rod which at one end projects into the support member and at the other end is rotatably connected to an upright support arm such that one support member, i.e. the upper, may be rotated to simulate opening of human jaws and thereby allow full observation of teeth connected to both support members.

DESCRIPTION OF THE PREFERRED EMBODIMENT

Figure 1:
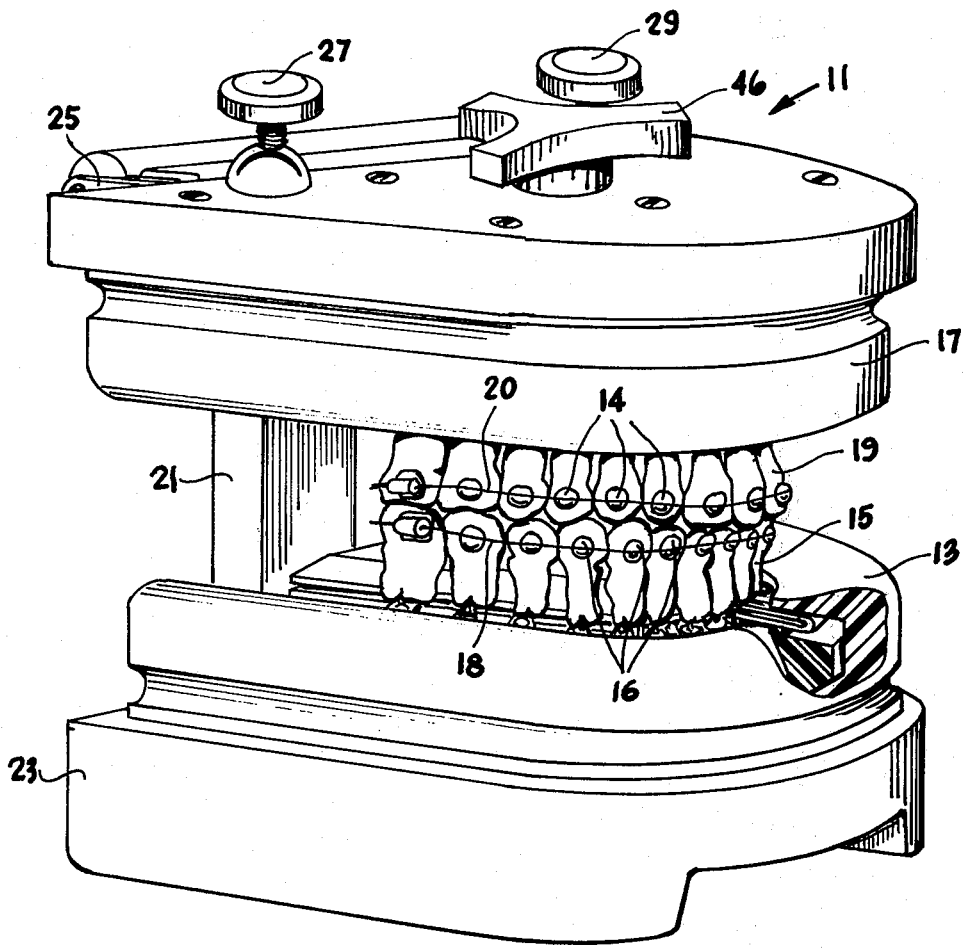
FIG. 1 is a perspective of the apparatus of the present invention with a partially cut away section.

In FIG. 1 a perspective view of orthodontic study model 11 is seen. The model includes a first planar support member 13 which has a U-shaped configuration generally resembling or simulating a human jaw. From a raceway within planar support member 13 a multiplicity of model teeth 15 are connected.

Similarly, from a second planar support member 17 a set of simulated upper teeth 19 are supported. An upright arm 21 extends perpendicularly upward from a pedistal 23, which also supports the first planar support member 13. A cantilever rod 25 extends from the upper portion of arm 21 into second planar support member 17 to fix its position relative to the first planar support member in a spaced relation, such that the first and second planar support members resemble opposed human jaws. Cantilever rod 25 is rotatably connected to arm 21 such that the second planar support member will rotate, relative to the first, simulating the opening of jaws.

The second planar support member 17 may be moved along cantilever rod 25 thereby adjusting its position relative to the first planar support member 13. When a desired position is reached, the locking screw 27 is tightened to fix the position of the second support member 17 relative to the first, 13. A second locking screw 29 performs a redundant function for another cantilever rod which may be used on the opposite side of arm 21, not shown.

Figure 2:
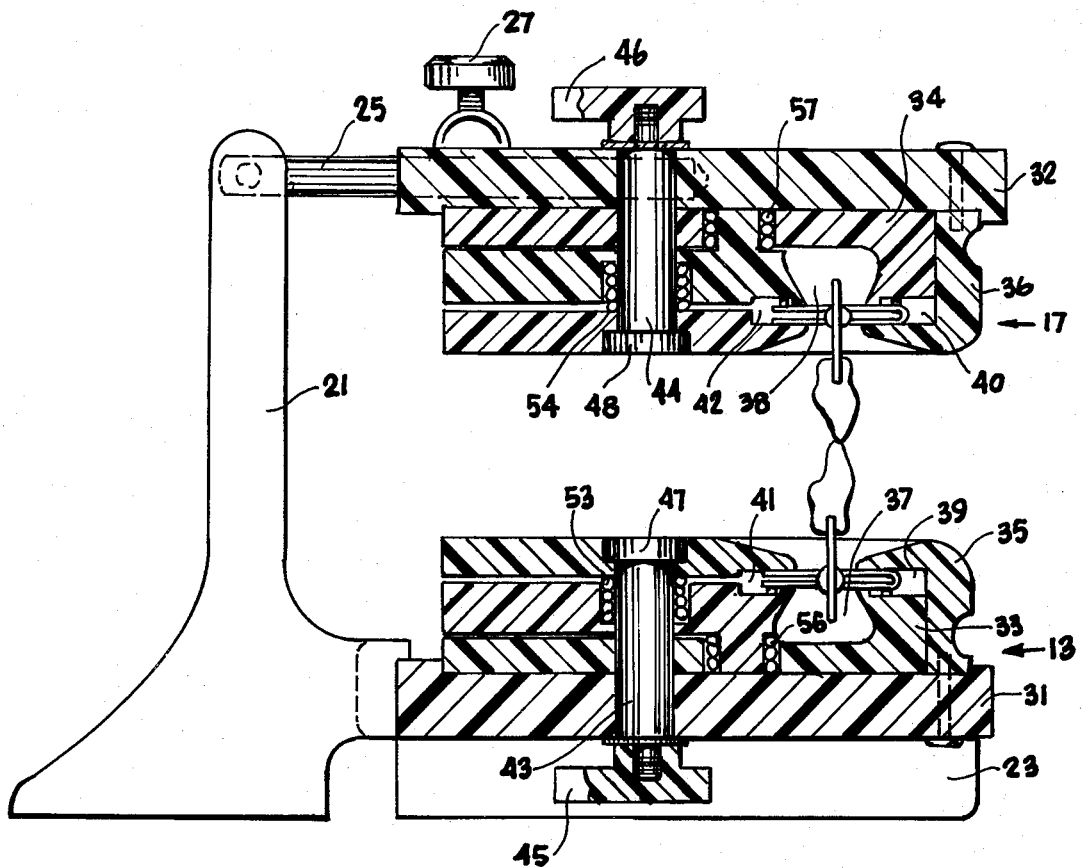
FIG. 2 is a side plan view of the apparatus of FIG. 1.

FIG. 2 illustrates constructional details of the apparatus FIG. 1. The first planar support member 13 is seen to comprise a base 31, a raceway housing 33, nested partially within base 31 and a raceway cap 35 covering the raceway housing 33.

A first raceway 37 has a general U-shape defined in the plane of the first support member 13 in dimensions and a position generally resembling human gums relative to the jaw shaped configuration of its planar support. On either side of raceway 37 are opposed parallel channels 39, 41. The channels 39, 41 have the same U-shaped configuration as raceway 37 and extend along the length thereof. The ends of the U-shaped raceway 37 are open so that model teeth may be inserted and removed from the apparatus. The second planar support member 17 is constructed similar to the first planar support member 13. Base 32 is supported from cantilever rod 25 at a desired lateral position and locked in place with locking screw 27. Connected to base 32 is a raceway housing 34 and a raceway cap 36. A second raceway 38 is defined in the plane of the second planar support member 17 in a U-shaped configuration as described above, simulating the position of human gums relative to the human jaw model of the planar support member. Channels 40, 42 extend parallel to raceway 38 along the full extent thereof and serve to guide model teeth as described below.

It will be seen that with respect to the first planar support member 13, the components thereof including base 31, raceway housing 33 and raceway cap 35 are held in place by means of clamping screw 43, having a nut 45, on one end thereof, said nut being accessible through an opening in pedestal 23. At the end of clamping screw 43 opposite nut 45 is a disc shaped head 47. Screw 43 projects through openings in base 31, raceway housing 33 and raceway cap 35, keeping them in alignment, together with pins 49, 51.

Clamping screw 43 serves as a part of a clamping means associated with the first planar support member 13 and with raceway 37 and holders for teeth therein by method explained below. The clamping means formed by clamping screw 43, nut 45, and head 47 operate as follows. As nut 45 is tightened, head 47 is forced toward the nut thereby exerting a compressive force on raceway housing 33, raceway cap 35 and base 31. A spring 53 helps to distribute some of the compressive forces when such a clamping means is operated.

Essentially the same structure exists in the second planar support member 17. A clamping screw 44 projects through base 32, raceway housing 34 and raceway cap 36, terminating in one end in a nut 46 and on the other end in a head 48. The method of operation of the clamping means thus formed is as described above. The method by which the clamping means retains teeth in a desired position will be explained below.

Figure 3:
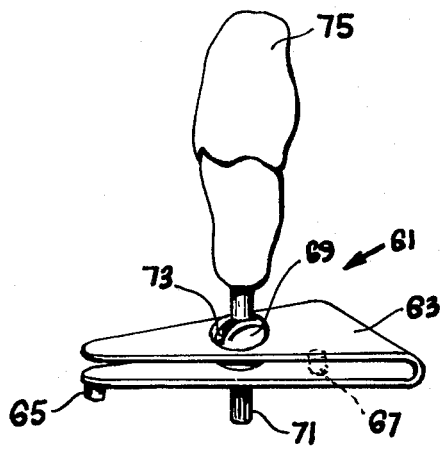
FIG. 3 is a perspective view of a portion of the apparatus, illustrating the mounting of a model tooth in a ball and socket member.

FIG. 3 shows a socket member which is adapted to the slidable within each of the two raceways. The socket member 61 comprises a folded leaf spring 63 and a pair of opposed studs 65, 67, both on the same side of leaf spring 63 and adapted and spaced to be confined in opposed channels of a support member, i.e., channels 39, 41 or 40, 42. Socket member 61 has a rotatable ball 69 injection molded with a hole therethrough. A hex spline 71 is disposed through the center of the hole, and a slit 73 is cut from the spline to the outside diameter of the ball. The slit is to allow the ball to constrict under clamping action so as to grip the spline and prevent radial and rotational movement. An end of spline 71 terminates in a model tooth 75.

Figure 4:
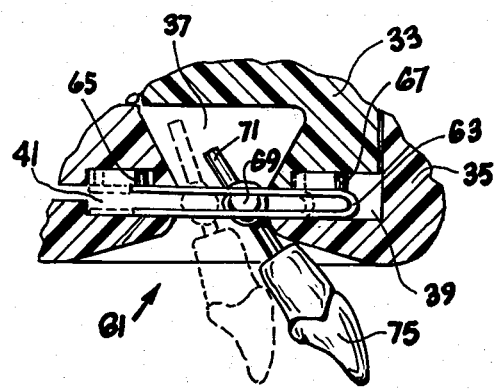
FIG. 4 is an operational view of the portion of the apparatus illustrated in FIG. 3 as mounted within the apparatus of FIG. 1.

FIG. 4 shows the manner in which socket member 61 is seated within raceway 37 and in particular the channels 39, 41. Note that the dashed lines in FIG. 4 indicate the possible lateral movement of socket member 61 which is made possible because the width of each channel is approximately 4 or 5 times greater than a comparable dimension of each stud transverse to the direction of each channel, i.e., the width of each channel is substantially greater than the width of studs therein thereby permitting lateral socket movement within the channel. The dashed lines in the figure also indicate that model tooth 75 may be adjusted radially in and out relative to the channel, thereby simulating possible vertical motions of a tooth. Similarly the dashed line indicates rotational movement of the tooth from one position to another so that the relative pitch of a tooth may be adjusted relative to socket member 61.

Recall that clamping screw 43 exerts compressional forces on raceway housing 33 and raceway cap 35. It can be seen in FIG. 4 that such compressional forces will cause both ends of the folded leaf spring 63 to be pressed together, thereby locking ball 69 in place. On one side of spring 63, raceway housing 33 pushes against raceway cap 35; on the other side of spring 63 a similar force is exerted by the portion of raceway cap 35 abutting head 47 pushing against the portion of raceway housing 33 adjacent screw 43, as shown in FIG. 2. Thus, there is double action clamping of spring 63.

Figure 5:
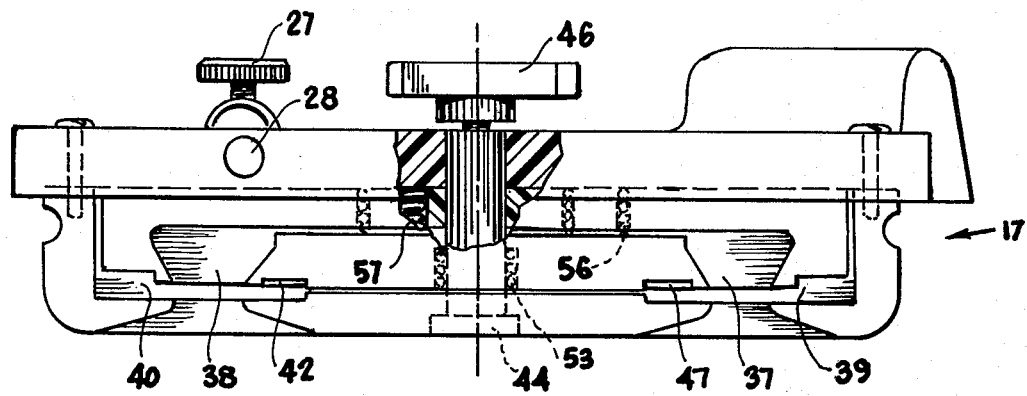
FIG. 5 is a split end view of a planar support member, without model teeth mounted therein.
Figure 6:
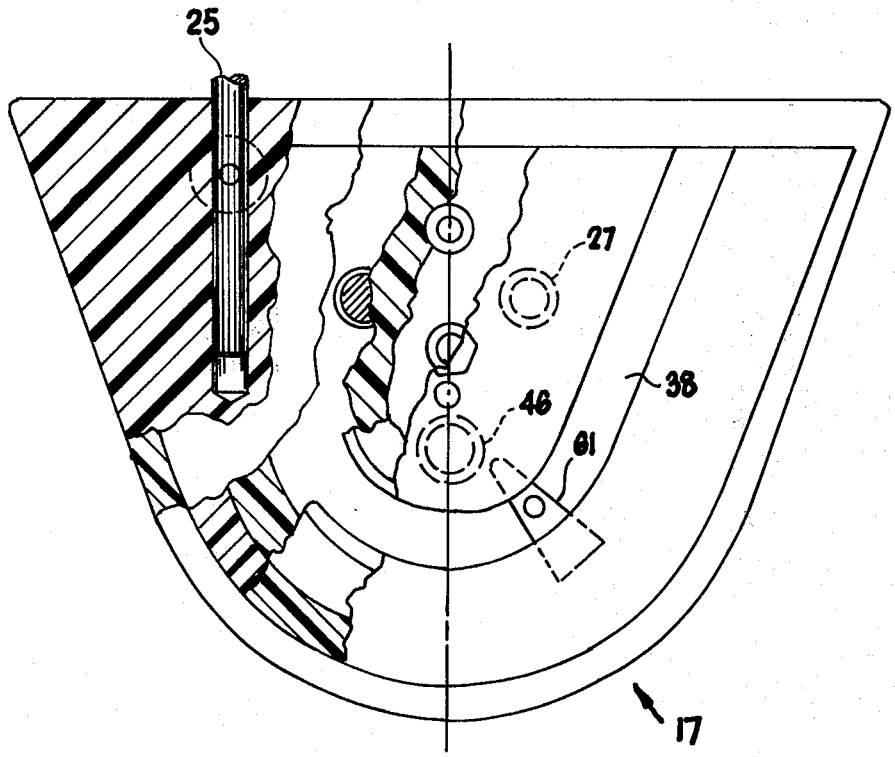
FIG. 6 is a top plan view of a support member, with a socket member mounted therein.

FIG. 5 is an end-view of the second planar support member 17 showing the U-shaped second raceway 38 with the opposed channels 40, 42, without socket members therein. FIG. 5 is split along the vertical center line thereby showing symmetric portions of the top and bottom of the support members, with the left hand side being the top portion and the right hand side being a bottom portion. Clamping screw 44 is shown with nut 46 terminating at an end thereof with spring 54 for distributing compressive forces and auxiliary spring 56 assisting it at a slightly spaced location. Other auxiliary springs may also be used to distribute forces, but they are not needed. In fact the method of applying compression to the U-shaped raceway 38 is but one means of so doing. Other means of applying compression, known to those skilled in the art, may also be used. The holes 26, 28 accommodate cantilever rods for suspending a second planar support member 17 in place and the locking screws 27, 29 form a third clamping means which, hold the second planar support member in a fixed position relative to the first planar support member, as previously described. It should be noted that the first and second clamping members are the nuts 45, 46 which serve to transmit compressive forces to the socket members, thereby holding respective sets of model teeth in place. FIG. 6 illustrates a top view of the second planar support member 17. In this figure the cantilever rod 25 is seen inserted in its respective hole. U-shaped raceway 38 is seen containing a socket member 61 which is slidable longitudinally along said raceway. Dashed phantom lines indicate the location of nut 46, as well as locking screw 27, forming a part of the third clamping means.

Referring again to FIG. 1 the lower teeth 15 can be seen fitted with orthodontic brackets 14, 16 and arch wires 18, 20 which are fixed to said brackets. It should be noted that neither the brackets nor the arch wires are part of the present apparatus but are merely illustrated for purposes of showing how to use the present apparatus.

Figure 7:
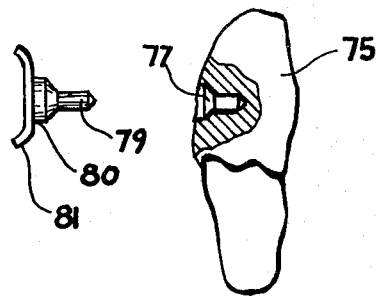
FIG. 7 is a side cut away view of a model tooth, showing the manner of mounting an orthodontic appliance in said model tooth.

FIG. 7 illustrates a method of applying orthodontic appliances to model teeth in a secure manner. A hole 77 is first drilled approximately half way through the tooth and enlarged or countersunk near the face of the tooth. A plug 79 having the shape or dimensions of hole 77 has an orthodontic appliance, or a part thereof, 81, welded in place at surface 80. Plug 79 is then cemented in hole 77. Hole 77 need not be drilled, but may be created in the process of forming the model tooth.

Once the model teeth 15, 19 are set in a desired position indicative of a patient's malocclusion the clamping nut 46 is tightened and an orthodontic appliance such as arch wire 20 is applied. The opposite clamping nut 45, not shown is tightened and the lower set of teeth are set in a malocclusion position and arch wire 18 is applied. As the clamp is slowly released, the teeth can be gently tapped on the occlusal surface with a soft instrument to simulate occlusal forces until the arch wire has worked out to a desired distance. Then the clamping nuts are tightened and arch wires are exchanged and the clamp is slowly released again, until no further tooth movement is desired or obtained.

It should be noted that the tooth root torquing occurs by three movements of a model tooth which occur simultaneously. A tooth and its connected spline pivot about the center of the ball giving tipping action. The spline slides through the ball to give vertical elevation or depression and the folded leaf spring slides in the direction of a torquing force as the preceding two steps are occurring.

A preferable material for the orthodontic model of the present invention, unless otherwise specified, is plastic, preferably a solidified resin, although the selection of any particular material is not of paramount importance.

The words vertical, horizontal, and lateral, as used herein, as well as similar directional terms, are intended to indicate relative directions and not any absolute directions.

I claim:

1. An orthodontic model of teeth comprising,
  a first planar support member having a shape generally simulating a human jaw, said first planar support member including a first base, a first housing defining a U-shaped raceway simulating the position of a human jaw nested within said first base, and a first raceway cap covering a portion of said first housing; said first base, first housing and first cap being coplanar, with said first housing and first cap being compressibly connected,
  a plurality of socket members, each socket member slidable within said first raceway to a desired position therein, each socket having a rotatable ball therein and having compression means for alternately holding and releasing said ball,
  a plurality of spline members, each spline member passing through one of said balls, each spline having a model tooth affixed to the end of said spline, with all of said model teeth disposed on the same side of said plane, and
  first clamping means associated with said first support member communicating with said compression means, said first clamping means connected to said first housing and first raceway cap for alternately exerting and releasing compression on said first housing and first cap whereby the compression means of said plurality of socket members holds and releases respective rotatable balls, spline members and model teeth.

2. The apparatus of claim 1 further comprising,
  a second planar support member having a shape generally simulating, and spaced apart from said first planar support member in a position simulating, a human jaw, said second planar support member including a second base, a second housing defining a U-shaped raceway simulating the position of a human gum nested within said second base, and a second raceway cap covering a portion of said second housing; said second base, second housing and second cap being coplanar, with said second housing and second cap being compressibly connected,
  a plurality of socket members, each socket member slidable within said first raceway to a desired position therein, each socket having a rotatable ball therein and having compression means for alternately holding and releasing said ball,
  a plurality of spine members, each spline member passing through one of said balls, each spline having a model tooth affixed to the end of said spline, with all of said model teeth disposed on the same side of said plane, and
  second clamping means associated with said second support member communicating with said compression means, said second clamping means connected to said second housing and said second raceway cap for alternately exerting and releasing compression on said second housing and second cap whereby the compression means of said plurality of socket members holds and releases respective rotatable balls, spline members and model teeth.

3. The apparatus of claim 2 further including cantilever means associated with said second planar support member for adjusting the alignment first and second support members with respect to each other.

4. The apparatus of claim 2 wherein each socket member includes a folded leaf spring defining a pair of opposed holes therein where said rotatable ball resides.

5. The apparatus of claim 4 wherein each of said raceways includes two opposed, parallel, channels, one on each side of said raceway.

6. The apparatus of claim 5 wherein each of said socket members includes a pair of opposed studs each confined in an opposed corresponding channel of a raceway.

7. The apparatus of claim 6 wherein the width of each channel relative to the dimension of each stud allows movement of said studs transverse to the direction of said channel.

8. The apparatus of claim 3 wherein said cantilever means includes at least one cantilever rod extending into said second planar support member at one end and rotatably connected to an upright arm at the opposite end thereof.

9. The apparatus of claim 4 wherein each planar support member comprises a base, a raceway housing nested within said base, and a raceway cap covering said raceway housing; said base, raceway housing and cap being coplanar; with said raceway housing and raceway cap being compressibly connected on opposite sides of said fold leaf for exerting force on said opposite sides.

10. The apparatus of claim 1 wherein said spline members have a cross section comprising a polygon.

11. The apparatus of claim 1 wherein each rotatable ball has a slit therein through an outside diameter of said ball for gripping said spline.

* * * * *